June 20, 1933.  E. C. HENDEL  1,914,424

AUTOMOBILE INDICATOR MOUNTING

Filed Sept. 3, 1932

INVENTOR
Earl C. Hendel
by Harry R. Williams
atty.

Patented June 20, 1933

1,914,424

UNITED STATES PATENT OFFICE

EARL C. HENDEL, OF WEST HARTFORD, CONNECTICUT

AUTOMOBILE INDICATOR MOUNTING

Application filed September 3, 1932. Serial No. 631,734.

This invention relates to the arrangement of indicating means—speedometer, odometer, oil pressure, temperature, battery charging or gasoline supply—and horn inciting means, on the steering wheel of an automobile.

The object of the invention is to provide a simple, inexpensive and attractive arrangement of the speed indicating and mileage counting or other indicating means, and the means for closing the warning circuit, at the center of the steering wheel with the indicating and warning giving means in direct line of vision of the driver and instantly accessible.

In the embodiment of the invention illustrated a case shown as having speed, mileage, oil and temperature indicating means, is located in an opening in the hub of the steering wheel and is fastened to the upper end of a fixed tube through which pass the speedometer actuating shaft, oil pressure tube, temperature wire, horn circuit wire and wire for an illuminating lamp. A flanged sleeve or bezel which is arranged around the outer end of the case and that covers the space between the case and wall of the opening in the wheel hub in which the case is located, has a slight movement axially of the case being thrust outward by a spring but when touched at any point and pressed inward closes the horn circuit.

Figure 1:
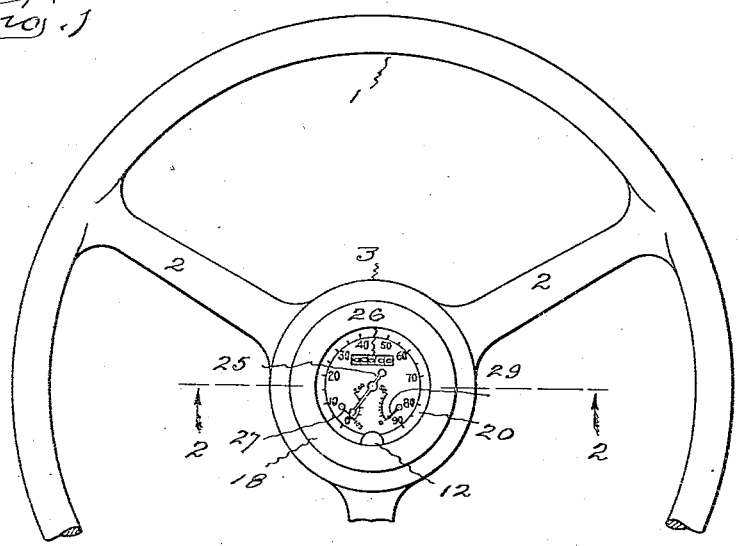
Fig. 1 shows a plan view of a portion of a steering wheel provided with a speedometer and horn inciting means embodying this invention.
Figure 2:
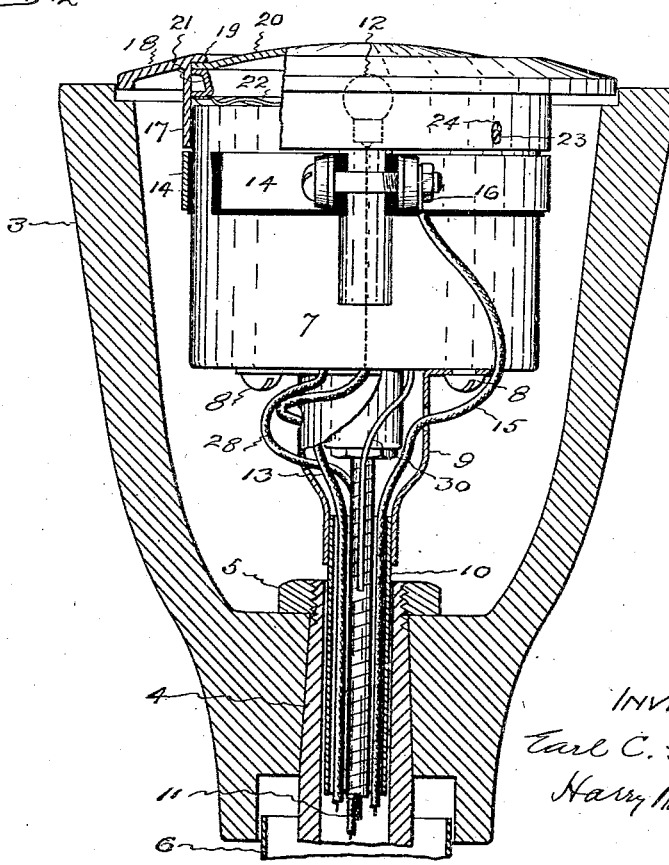
Fig. 2 is a vertical section, on larger scale, taken on the plane indicated by the dotted line 2—2 on Fig. 1.

The steering wheel shown has rim 1 connected by spokes 2 with a centrally recessed hub 3. The wheel hub is fastened to the tapering upper end of the rotatory steering tube 4 by a nut 5 in the customary manner, and the steering tube extends through the tubular supporting post 6 as in the ordinary construction.

The speedometer may be any common type with speed and mileage indications, and its case 7 is secured by screws 8 to a shell 9 that is fastened to the upper end of a non-rotatable tube 10 in such manner that the speedometer is held in fixed position in the center of the recess in the hub of the steering wheel. The encased speedometer actuating shaft or cable 11 extends through the fixed tube 10 and into the bottom of the case. A lamp 12 is arranged in the speedometer case in position to illuminate the indications, and a circuit wire 13 leads from the current source through the tube 10, shell 9 and case 7 to one of the lamp terminals, the other lamp terminal being grounded.

Clamped on the exterior of the speedometer case but electrically insulated therefrom is a metallic band 14. A wire 15 which forms part of the circuit in which the horn or other warning instrument is connected, leads through the tube 10 and is fastened to this insulated band by the clamp nut 16. Fitted to move axially on the outer end of the speedometer case is the bezel which comprises a sleeve 17 with exterior flange 18 that covers the space between the speedometer case and the wall of the opening in the steering wheel hub. This bezel member also is shown as having an inturned rim 19 that extends over the edge of a cover 20 which may be made of glass or other transparent material. The cover is illustrated as retained in place by a ring 21 that is pressed outward by an annular spring 22. Screws 23 turned in the case through slots 24 in the wall of the sleeve limit the outward movement of the bezel and cover. This spring not only retains the cover in place but normally presses the bezel outward so that the inner edge of the sleeve 17 is normally slightly spaced from the edge of the insulated band 14. A slight downward pressure upon the bezel or upon the cover at any point moves the sleeve 17 inward and causes its inner edge to contact with the inner edge of the band 14, and as the band 14 is connected with the horn circuit and the sleeve 17 is grounded, the circuit is completed and the horn is sounded.

The case may contain any desired indicating means, that shown having a pointer 25 for indicating speed, disks 26 for counting mileage, a pointer 27 for indicating temperature the energy for actuating which is conducted through wire 28, and a pointer 29 for indicating oil pressure which is exerted through tube 30. These are of well known construction and are not illustrated in detail. Any other desired arrangement of indicating means may be substituted for those shown.

The case with the indicators is fixed and is in the direct line of vision of the driver of the machine, and by a mere touch of the bezel or cover the horn may be sounded whenever desired. The parts are not only simple to construct, but the horn sounding bezel arranged in the manner described forms an attractive finish for the instrument and center of the steering wheel.

The invention claimed is:

1. The combination with the steering wheel of an automobile, of an indicator case fixed within a recess in the wheel hub, a bezel movable axially of the case and covering the opening between the case and the wall of the recess in which the case is mounted, means normally pressing the bezel outward, and a terminal of a signal circuit insulated from the case and positioned to be engaged by the bezel when the bezel is pressed inward.

2. The combination with the steering wheel of an automobile, of an indicator case fixed centrally within a recess in the wheel hub, a bezel mounted on and movable axially of the case and covering the opening between the case and the wall of the recess in which the case is mounted, means normally pressing the bezel outward, and a terminal of a signal circuit attached to but insulated from the case in position to be engaged by the bezel when the bezel is pressed inward.

3. The combination with the steering wheel of an automobile, of an indicator case fixed within a recess in the wheel hub, a bezel encircling and movable on the case and covering the opening between the case and the wall of the recess in which the case is mounted, means normally pressing the bezel outward, and a terminal of a signal circuit attached to but insulated from the case in position to be engaged by the bezel when the bezel is pressed inward.

4. The combination with the steering wheel of an automobile, of an indicator case fixed within a recess in the wheel hub, a bezel having a sleeve fitted to move axially on the case and having a flange covering the opening between the case and the wall of the recess in which the case is mounted, means normally pressing the bezel outward, and a terminal of a signal circuit insulated from the case and positioned to be engaged by the bezel when the bezel is pressed inward.

5. The combination with the steering wheel of an automobile, of an indicator case fixed within a recess in the wheel hub, a bezel having a sleeve fitted to move axially on the case and having a flange covering the opening between the case and the wall of the recess in which the case is mounted, a spring normally pressing the bezel outward, a band clamped about but insulated from the case and positioned to be engaged by the bezel when the bezel is pressed inward, and a circuit terminal attached to said band.

6. The combination with the steering wheel of an automobile, of a speedometer fixed within a recess in the wheel hub, a bezel having a sleeve fitted to move axially on the speedometer case and having a flange covering the opening between the case and the wall of the recess in which the speedometer is mounted, a transparent cover held by the bezel, a spring pressing the bezel outward and retaining said cover in position, a band clamped about but insulated from the speedometer case and positioned to be engaged by the bezel when the bezel is pressed inward, and a circuit terminal attached to said band.

7. The combination with the steering wheel of an automobile, of an indicator case stationarily mounted in a recess in the wheel hub, a bezel encircling and movable axially on the case, means normally pressing the bezel outward, and a terminal of a signal circuit insulated from the case and positioned to be engaged by the bezel when the bezel is pressed inward.

8. The combination with the steering wheel of an automobile, of a speedometer stationarily mounted in a recess in the wheel hub, a bezel encircling and movable axially on the speedometer case, means normally pressing the bezel outward, and a terminal of a signal circuit positioned to be engaged by the bezel when the bezel is pressed inward.

EARL C. HENDEL.